United States Patent [19]
Huang et al.

[11] Patent Number: 5,636,339
[45] Date of Patent: Jun. 3, 1997

[54] CIRCUIT STRUCTURE AND SYSTEM CONFIGURATION FOR IMPLEMENTING PSEUDO FOUR-POINT INTERPOLATION

[75] Inventors: Gwo-Sheng Huang, Chai-I; Yee-Lu Zhaog, Tao-Yuan, both of Taiwan

[73] Assignee: Industrial Technology Research Institute, Hsinchu, Taiwan

[21] Appl. No.: 209,969

[22] Filed: Mar. 14, 1994

[51] Int. Cl.$^6$ .................................................. G06T 1/00
[52] U.S. Cl. ............................................ 395/142; 395/501
[58] Field of Search .................................. 395/133–139, 395/141, 142, 143, 162–166; 348/441, 445; 364/723

[56] References Cited

U.S. PATENT DOCUMENTS 5,351,087  9/1994  Christopher et al. .................. 348/441

*Primary Examiner*—Almis R. Jankus
*Attorney, Agent, or Firm*—Bo-In Lin

[57] ABSTRACT

The present invention discloses a data processing module for generating an interpolated output from four sampled input data. The data processing module includes an input means, i.e., a memory module, for receiving the four sampled input data. The data processing module further includes a pseudo four-point interpolation (PFPI) module for receiving a ratio value p and for generating the interpolated output by utilizing a novel pseudo four-point interpolation algorithm as represented by an Equation (6).

12 Claims, 6 Drawing Sheets

CIRCUIT STRUCTURE AND SYSTEM CONFIGURATION FOR IMPLEMENTING PSEUDO FOUR-POINT INTERPOLATION

BACKGROUND OF THE INVENTION

1. Field of the Invention

This invention relates generally to the circuit structure and method for digital signal and image data processing. More particularly, this invention relates to the circuit structure, system configurations and the methods for applying a pseudo four-point interpolation (PFPI) to digital signal and image data processing.

2. Description of the Prior Art

As there are greater demand for higher quality image display or high fidelity audio recording and broadcasting, the performance levels of such systems are often dictated by the speed and accuracy of sampled data processing, such as data interpolation. Particularly, due to the demands for higher quality output from these systems, the sampling rates as originally provided as input often become insufficient to satisfy the accuracy or quality requirements. A method of interpolation is often employed to generate more data points between the sampled data for the purpose of improving the quality of system output. One of the most common applications is for a graphic display system to zoom up a particular zone of the display field wherein more display data must be generated instantaneously at high speed and with high precision such that the zoom-image can be produced on demand and without distortions.

FIG. 1 shows the method employed by a conventional interpolation scheme wherein a typical two-point linear interpolation algorithm is applied. In order to obtain an interpolated point between two sampled data $f_{i-1}$ and $f_i$, an assumption is made that there is a first order linear function exists between these two sampled data, i.e., $f_{i-1}$ and $f_i$. On the basis of this simple assumption, a straight line is connected between $f_{i-1}$ and $f_i$. A new interpolated sample point f can therefore be computed by simply providing the relative position of this interpolated sample point f. Generally, this relative position of f is provided as a ratio of distances between the point f to $f_{i-1}$ and point $f_i$ to $f_{i-1}$.

The conventional interpolation technique presents two problems. First, this simple assumption of a first order liner function between two sampled point is often not sufficiently accurate. This is especially true where there are greater variations between two sampled points. For example, in an image display field, the light intensity between two pixels on the edges of a display subject generally has a sudden and non-linear variations. This conventional simple model will not be able to provide high quality definition of the edges for the subject when a zooming image is required. Secondly, due to this limitation in accuracy, the conventional two-point technique is not able to consistently generate high quality zooming images which is often required in modern image processing devices. When a targeted small area of an image field is zoomed, the display data of additional image pixels must be calculated and then inserted for display. These processes have to be performed instantaneously. The quality of the zooming images are often limited by the greater distortions of the interpolated image pixels. Particularly, display image may become distorted for a zooming operation performed in an area where greater data-variations are present between adjacent pixels in the original image field. The zooming function of a video device is degraded due to the unpleasant visual effects cause by the distorted interpolation computations employed in the conventional video systems.

For the purpose of improving the interpolation accuracy, various techniques have been proposed. More sampled data points may be used for the computation of an interpolated point. These techniques often involve the use of quadratic or even higher order functions as approximations for providing a correlation between the multiple sampled data points and the intended interpolated point. However, because the solution process of these higher order functions often involve more complex computations, the processing speed usually is significantly decreased. Therefore, even that the techniques of employing more sampled points by solving higher order equations can provide higher interpolation accuracy and better quality interpolated results, the slower processing speed nevertheless often becomes the greatest limitation. The usefulness of these techniques are still very restricted.

Therefore, there is still a demand in the art of digital signal processing for an improved interpolation technique. Particularly, in the fields of the audio, visual or other multimedia applications where sampled data interpolation techniques are constantly being employed, it is critically important to have an interpolation technique which can provide accurate interpolation data and in meantime satisfying the high speed processing requirement. Therefore, it is required that this interpolation process can be effectively executed at high speed without the need of using complex algorithms. Preferably, this interpolation technique can be implemented by the use of modularized circuit structures such that the implementation can be carried out conveniently and economically.

SUMMARY OF THE PRESENT INVENTION

It is therefore an object of the present invention to provide a modularized circuit structure and system configuration for implementing a pseudo four-point interpolation algorithm such that aforementioned difficulties encountered in the prior art may be resolved.

Specifically, it is an object of the present invention to provide a modularized circuit structure and system configuration for implementing a pseudo four-point interpolation algorithm such that the interpolation accuracy can be improved.

Another object of the present invention is to provide a modularized circuit structure and system configuration for implementing a pseudo four-point interpolation algorithm such that the interpolation accuracy is significantly improved by the use of four sampled data without sacrificing the processing speed.

Another object of the present invention is to provide a modularized circuit structure and system configuration for implementing a pseudo four-point interpolation algorithm such that the PFPI technique can be conveniently and economically implemented.

Briefly, in a preferred embodiment, the present invention comprises a data processing module for generating an interpolated output from four sampled input data. The data processing module includes an input means, i.e., a memory module, for receiving the four sampled input data. The data processing module further includes a pseudo four-point interpolation (PFPI) module for receiving a ratio value p and for generating the interpolated output by utilizing Equation (6).

It is an advantage of the present invention that the it provides a modularized circuit structure and system configuration for implementing a pseudo four-point interpolation algorithm such that aforementioned difficulty encountered in the prior art may be resolved.

Specifically, an advantage of the present invention is that it provides a modularized circuit structure and system configuration for implementing a pseudo four-point interpolation algorithm such that the interpolation accuracy can be improved.

Another advantage of the present invention is that it provides a modularized circuit structure and system configuration for implementing a pseudo four-point interpolation algorithm such that the interpolation accuracy is significantly improved by the use of four sampled data without sacrificing the processing speed.

Another advantage of the present invention is that it provides a modularized circuit structure and system configuration for implementing a pseudo four-point interpolation algorithm such that the PFPI technique can be conveniently and economically implemented.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 2:
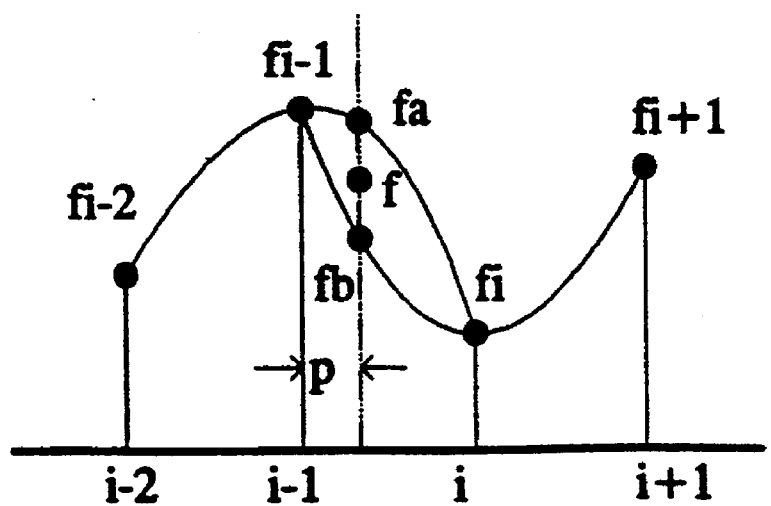
FIG. 2 is a schematic diagram showing the operation of an interpolation according to the present invention.

For the purpose of fully describing the pseudo four point interpolation (PFPI) method according to the present invention, please first refer to FIG. 2 wherein four sampled points of a function f(x) is shown. These four sampled points are shown as $f_{i-2}$, $f_{i-1}$, $f_i$, and $f_{i+1}$ respectively. The values of the function f(x) are unknown between $f_{i-1}$ and $f_i$. An assumption is made that the function f(x) is a continuous function between $f_{i-1}$ and $f_i$. Suppose that the interpolation is to compute a new interpolated sample point, i.e., f, between $f_{i-1}$ and $f_i$, the following computations are employed by the PFPI method. An interpolated sample point fa is first calculated by the use of the first three sampled points, i.e., $f_{i-2}$, $f_{i-1}$, and $f_i$.

$$f_a = f_i(p^2+p)/2 + f_{i-1}(1-p^2) + f_{i-2}(p^2-p)/2 \qquad (2)$$

where p is the distance ratio between the point f to $f_{i-1}$ and $f_{i-1}$ to $f_i$ along the X-axis, i.e., $$p = [X-(i-1)]/[i-(i-1)] \qquad (3)$$

Similarly, another interpolated sample point $f_b$ can be calculated by the use of the last three sampled values, i.e., $f_{i-1}$, $f_i$, and $f_{i+1}$.

$$f_b = f_{i+1}(p^2-p)/2 + f_i(2p-p^2) + f_{i-1}[(p^2-3p)/2+1] \qquad (4)$$

Then the value of the new interpolated sampled point f can be computed as the average of $f_a$ and $f_b$, i.e., $$f = (f_a+f_b)/2 \qquad (5)$$

which in turn can be expressed as:

$$f = f_{i+1}(p^2-p)/4 + f_i(p-(p^2-p)/4) + f_{i-1}[1-p-(p^2-p)/4] + f_{i-1}(p^2-p)/4 \qquad (6)$$

Figure 1:
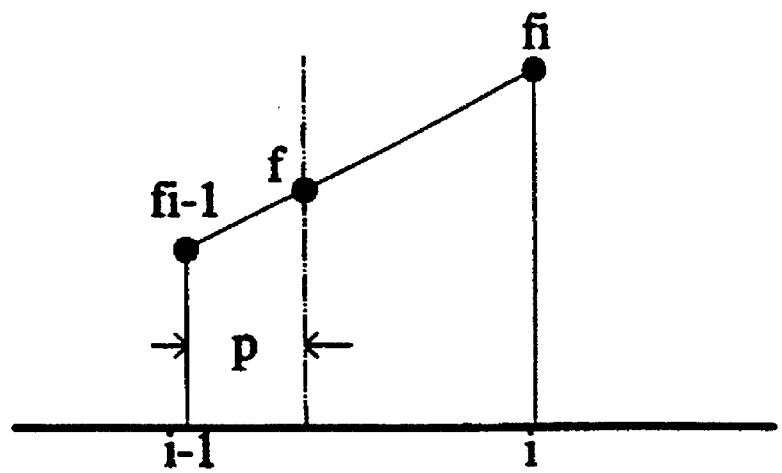
FIG. 1 is a schematic diagram showing the operation of an interpolation used in the prior art.
Figure 3B:
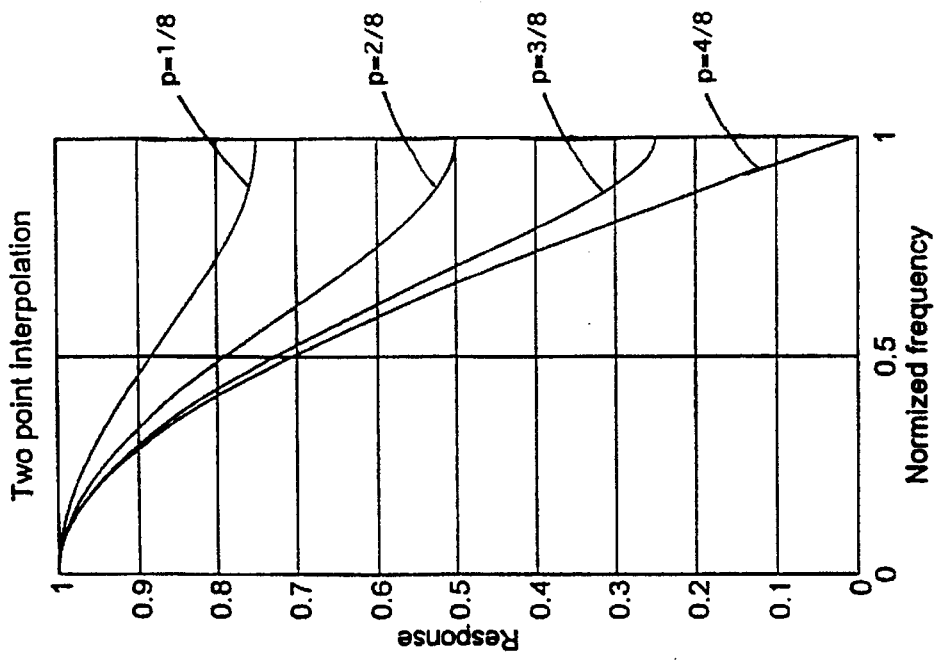
FIGS. 3A and 3B compare the level of accuracy of interpolation between the prior method and the method of the present invention.
Figure 3A:
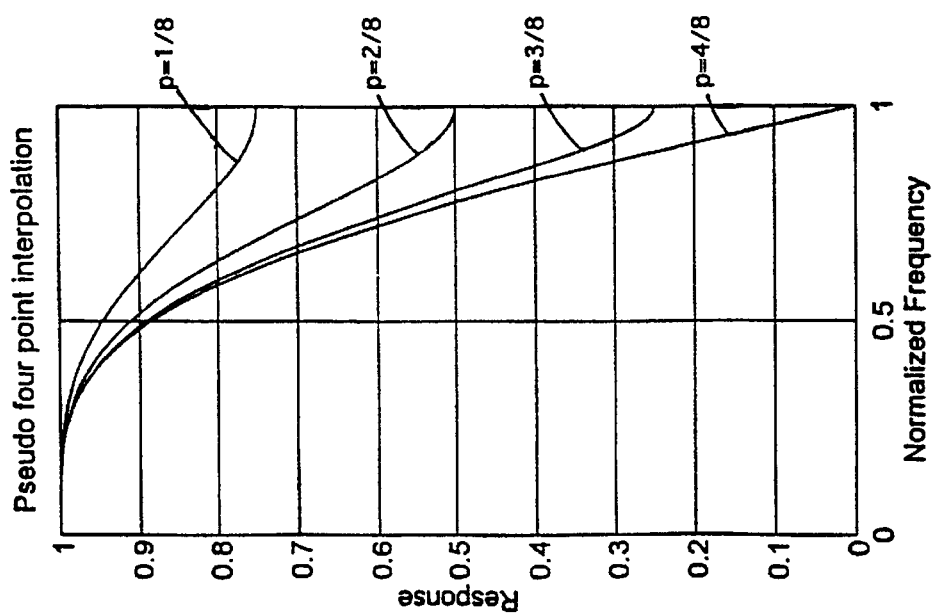

The accuracy of the interpolation is improved significantly over that of the prior art method using the two-point interpolation. FIG. 3 compares the interpolation responses for a two-point interpolation (FIG. 3A) and a pseudo four-point interpolation method (FIG. 3B) according to the present invention. The frequency responses are shown as a function of a normalized frequency at different values of p. The drop-off rate of the frequency response representing the likelihood of interpolation inaccuracy which is smaller in FIG. 3B where the PFPI of the present invention is used than that of the two-point interpolation in FIG. 3A according to the prior art method as described for FIG. 1.

Figure 4:
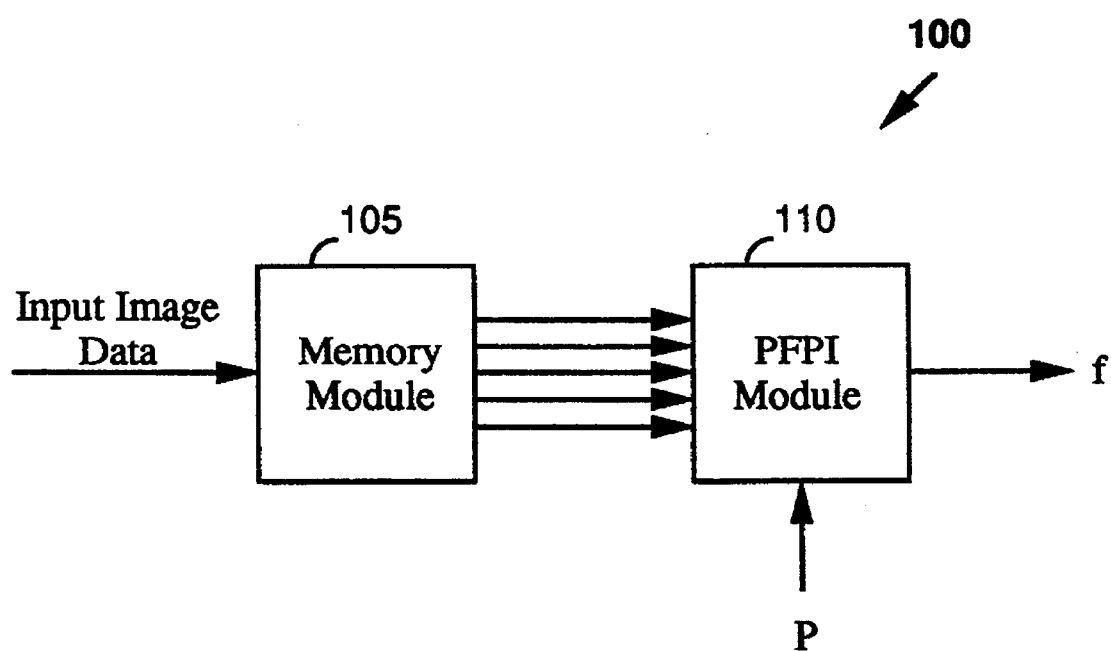
FIG. 4 is a block diagram showing the operation of a data processing module in performing an interpolation according to the present invention.

Referring to FIG. 4 where a simplified functional block diagram for an interpolation circuit 100 is shown. The image data are received and stored in a memory module 105. In order to perform the PFPI interpolation, four sampled data $f_{i-2}$, $f_{i-1}$, $f_i$ and $f_{i+1}$ are received by a PFPI module 110. The PFPI module 110 also receives a value p which is computed according to Equation (3). The PFPI module then performs the interpolation function by utilizing Equation (6) to generate an interpolated data f.

Figure 5:
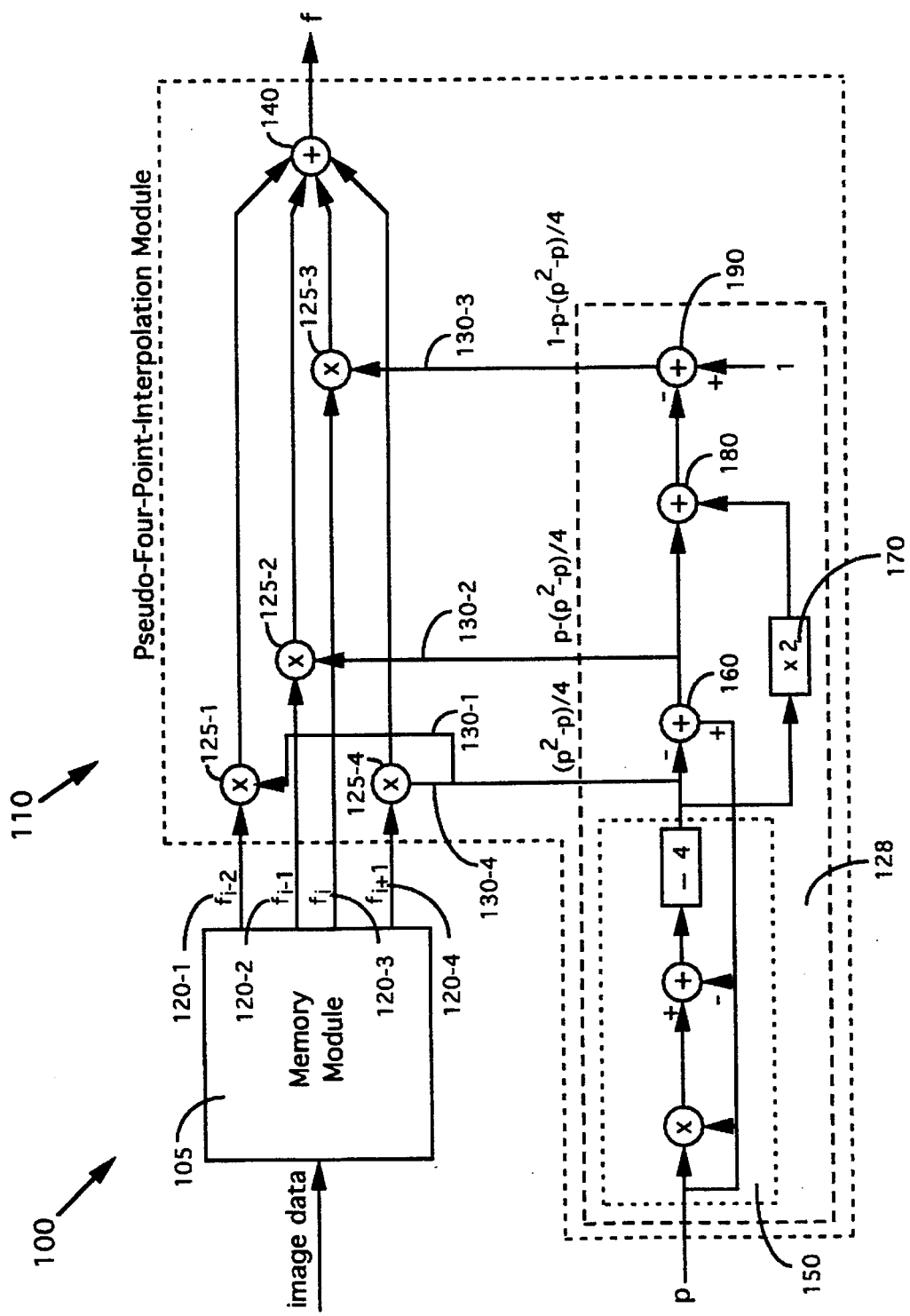
FIG. 5 is schematic block diagram of a data processing system performing an interpolation operation by using the method of the present invention.

FIG. 5 shown a preferred embodiment for the present invention to carry out the PFPI algorithm according to Equation (6). The PFPI module 110 comprises a plurality of adder and multipliers to perform the PFPI interpolation using the image data received from the memory module 105. The PFPI module 110 includes four image data lines, i.e., data lines 120-1, 120-2, 120-3, and 120-4, wherein each line has a multiplier, i.e., multipliers 125-1, 125-2, 125-3, and 125-4. The PFPI module 110 further includes an image-data coefficient generating means 128 to generate an interpolation coefficient for each of the data image lines 120. The interpolation coefficient for each image data line is then transmitted via four interpolation coefficient lines, i.e., lines 130-1, 130-2, 130-3, and 130-4 to the multiplier 125-1, 125-2, 125-3, and 125-4 respectively. The multipliers 125-1 to 125-4 receive the interpolation coefficients from the interpolation coefficient lines 130-1 to 130-4 to perform a multiplication of an image data to a corresponding interpolation coefficient. The PFPI module further includes a final summing means 140 which is an adder for adding the four terms of the four image data $f_{i-2}$, $f_{i-1}$, $f_i$ and $f_{i+1}$ to generate the final interpolated data f according to Equation (6).

As shown in FIG. 5, the interpolation coefficient generating means 128 further includes an separate $(p^2-p)/4$ module 150 for the computation of the value of $(p^2-p)/4$. The separate module 150 is to take advantage of the fact that in each of the terms in Equation (6), the factor $(p^2-p)/4$ appears repeatedly. By generating a value for this $(p^2-p)/4$ factor by utilizing a separate $(p^2-p)/4$ module can eliminate repetition and achieve saving of either hardware and software resources and meanwhile reduce the time requirement spent by the interpolation function. By the use of the output generated by the $(p^2-p)/4$ module 150, the interpolation coefficient transmitted on each of the interpolation coefficient lines, i.e., 130-1 to 130-4 to the multiplier 125-1 and 125-4 respectively can be easily reconstructed from FIG. 5. The interpolation coefficients transmitted on the lines 130-1 and 130-4 are simply $(p^2-p)/4$ which is the direct output generated by the $(p^2-p)/4$ module 150. The interpolation coefficients transmitted on the line 1302 to the multiplier 125-2 is calculated by first inverting the output generated from the $(p^2-p)/4$ module 150 to obtain the negative value of value of $(p^2-p)/4$ and then add a value p by the use of an adder 160 to compute the value of the interpolation coefficient p- $(p^2-p)/4$ for the multiplier 125-2 to be multiplied to $f_{i-1}$. The interpolation coefficient for transmitting to the multiplier 125-3 is processed by first multiplying the value of $(p^2-p)/4$ by the use of a multiplier 170 by two to obtain a value of $(p^2-p)/2$, which is then added, by the use of an adder 180, to the value of p–$(p^2-p)/4$ generated by the adder 160 to obtain a value of p+$(p^2-p)/4$. The output from the adder 180 is then inverted to obtain a value of $-[p+(p^2-p)/4]$ which is then added to 1 by the use of an adder 190 to compute the final interpolation coefficient $[1-p-(p^2-p)/4]$ for the multiplier 125-3 to be multiplied to $f_i$. Thus a compact and modularized PFPI circuit is configured to perform the interpolation by utilizing PFPI method according to Equation 6.

Figure 6:
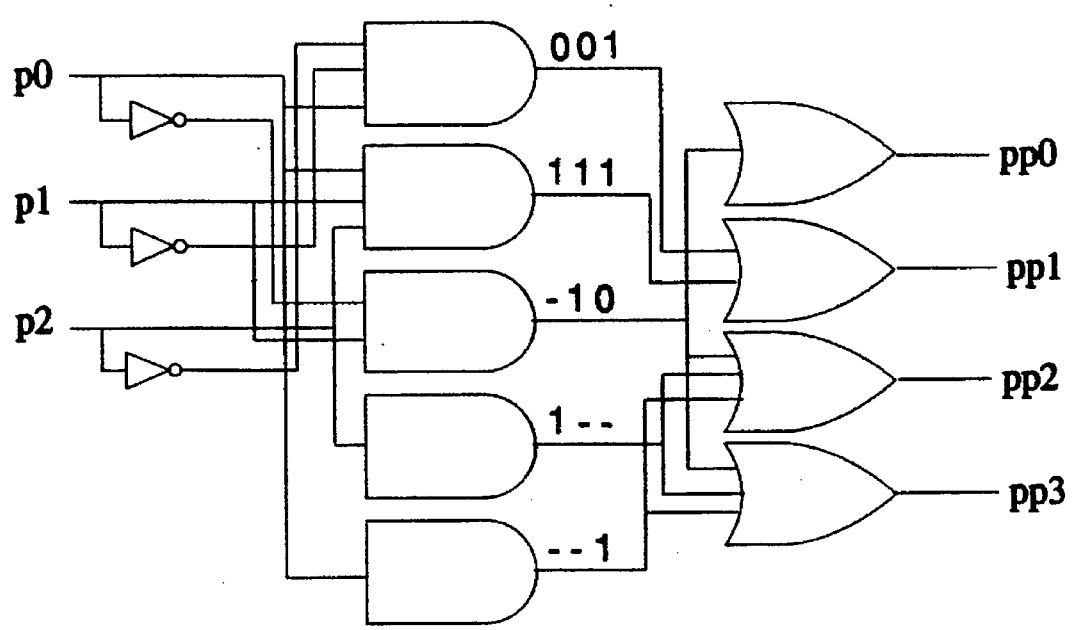
FIG. 6 is a logic circuit diagram showing the configuration of a program logic array (PLA) for carrying out a $(p^2-p)/4$ operation.

The separate $(p^2-p)/4$ module 150 can be implemented by the use of a program logic array (PLA) as shown in FIG. 6. For the purpose of illustration, a three-bit input and four-bit output PLA is used where a truth table of $(P^2-P)/4$ is listed on top of the PLA and the sign '–' for the value of P0, P1, or P2 represent the value of that bit is not required for the determination of the four-bit output value represented by PP1, PP2, PP3, and PP4. By the use of the inverters, the five AND gates and the four OR gates, the values of $(P^2-P)$ can be readily obtained and the division by four can be easily computed by shifting two bits to the left.

Figure 7:
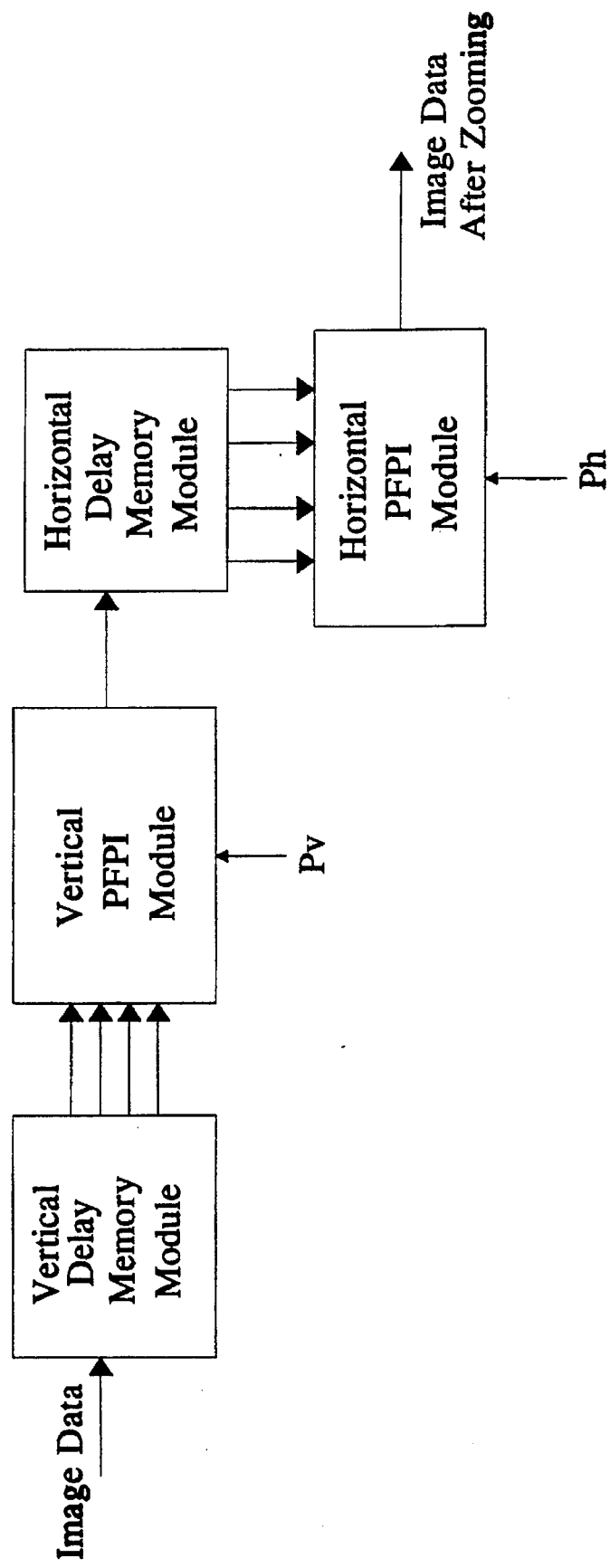
FIG. 7 is an image zooming system which employs the interpolation module of the present invention.

Referring to FIG. 7 where a preferred embodiment of the present invention, i.e., a zooming system 200 is shown. The image zooming system 200 receives a sequence of image data typically representing the image data of a plurality of horizontal scanning lines which are stored in a vertical delay memory module 210. A vertical zooming is first performed by the use of a vertical PFPI module 220 which implements the circuit structure as that shown in FIGS. 4 to 6 to perform the interpolation according to the algorithm of Equation 6. The vertically zoomed data $P_v$ are then temporaly stored in a horizontal delay memory module 230 which are then inputted to horizontal PFPI module 240 for computing the interpolation data and in order to generate the horizontal zooming display data $P_h$.

In summary a data processing module 100 for generating an interpolated output from four sampled input data is disclosed in the present invention. The data processing module 100 includes an input means, i.e., the memory module 105 for receiving the four sampled input data. The data processing module further includes a pseudo four-point interpolation (PFPI) module 110 for receiving a ratio value p and for generating the interpolated output by utilizing Equation (6).

According to the above description, this invention discloses a data processing module 100 for generating an interpolated output from four sampled input data. The data processing module 100 comprises an input means, i.e., the memory module 105, for receiving the four sampled input data which including four sample data lines, i.e., lines 120-1 to 120-4, for receiving each of the four sampled input data wherein each of the sample data line further including a multiplication means, i.e., the multipliers 125-1 to 125-4. The data processing module 100 further includes a pseudo four-point interpolation (PFPI) module 110 for receiving a ratio value p and for generating the interpolated output by utilizing Equation (6). The PFPI module 110 further includes an interpolation coefficient generating means 128 for generating a pseudo four-point interpolation (PFPI) coefficient according to Equation (6). The interpolation coefficient generating means 128 is connected to the multipliers on the sample data lines, i.e., the multipliers 125-1 to 125-4 via the lines 130-1 to 130-4 respectively, for providing the PFPI coefficients to the multiplication means for multiplying each of the PFPI coefficients to the corresponding sampled input data therein. The interpolation coefficient generating means 128 further includes a separate $(p^2-p)/4$ module 150, three adders, i.e., adders 160, 180 and 190, and one multiplier 170 connected in according to FIG. 5 for generating the PFPI coefficients. The PFPI module 110 further including a summing means, i.e., the adder 140, for receiving and summing the results of the multiplication from the multipliers for generating the interpolated output.

According to the present invention an image zooming processor 200 is also disclosed which receives a plurality of image data for performing an image zooming operation. The zooming processor 200 comprises a vertical delay memory module 210 for receiving and temporary storage of the image data therein. The zooming processor 200 further includes a vertical pseudo four-point interpolation module 220 for performing a vertical interpolation to the image data by utilizing a PFPI algorithm according to Equation 6. The zooming processor 200 further includes a horizontal delay memory module 230 for receiving and temporary storage of the vertically zoomed image data $P_v$ from the vertical PFPI module 210. The zooming processor 200 further includes a horizontal pseudo four-point interpolation module 240 for performing a horizontal interpolation to the vertically zoomed image data by utilizing the PFPI algorithm according to Equation 6 in order to generate the horizontal zooming display data $P_h$.

This invention also discloses a method for generating an interpolated output from four sampled input data. The method comprises the steps of (a) receiving the four sampled input data and a ratio value p; and (b)) applying Equation (6) by utilizing the ratio value p with the four sampled input data for performing a pseudo four-point interpolation (PFPI) operation to generate the interpolated output. In another preferred embodiment, the method for generating the interpolated output wherein the step (b) of performing a PFPI operation further comprises a step of (b1) utilizing an interpolation coefficient generating means for generating a pseudo four-point interpolation (PFPI) coefficient for each of corresponding sampled input data and multiplying the PFPI coefficient to each of the corresponding sampled input data and adding the products generated from the multiplications according to Equation (6).

The present invention thus provides a method and circuit architecture for generating accurate interpolated output data from four input samples by the use of a pseudo four-point interpolation (PFPI) module. The PFPI module can be easily implemented as an integrated circuit (IC) by taking advantage of a repeated term of $(p^2-p)/4$ in the PFPI algorithm. This method and circuit circuit architecture can be broadly applied to many different operations where an interpolation may be required. A specific example is the application of such an PFPI module to an image zooming system. The image quality and the zooming speed are greatly improved by the use of this PFPI module.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A data processing module for generating an interpolated output from four sampled input data comprising:

an input means including four sample data lines for receiving each of said four sampled input data wherein each of said sample data line is connected to a multiplier;

a pseudo four-point interpolation (PFPI) coefficient generating circuit for receiving an interpolation ration p;

each of said multipliers on each of said sample data lines is connected to said coefficient generating circuit to receive a interpolation coefficient therefrom for performing a multiplication of said sampled input to said interpolation coefficient thereon for generating a weighted sample output on each of said four sample data lines; and an adder connected to said four multipliers on said four sample data lines for adding said four weighted sample output to generate said interpolated output from said four sampled input data.

2. The data processing module of claim 1 wherein:

said PFPI coefficient generating circuit including a circuit module for processing said interpolation ratio p for generating a $(p^2-p)/4$ output as one of said interpolation coefficients; and said PFPI coefficient generating circuit further including adders and a multiplier for generating a $p-(p^2-p)/4$ output and a $1-p-(p^2-p)/4$ output as said interpolation coefficients.

3. The data processing module of claim 2 wherein:

said circuit module for processing said interpolation ratio p for generating a $(p^2-p)/4$ output further including a multiplier for multiplying said ratio p to itself to generate a $p^2$ output, an inverter and adder to generate a $p^2-p$ output, and a divider to generate a $(p^2-p)/4$ output.

4. The data processing module of claim 3 wherein:

said circuit module for processing said interpolation ratio p for generating a $(p^2-p)/4$ output being configured as a programmable logic array (PLA) including a plurality of bit lines for receiving said p wherein each bit line connected with inverters, AND, and OR gates for generating a multiple bit for said $(p^2-p)/4$ output.

5. The data processing module of claim 3 wherein:

said four sampled input data received by said four sample data lines are four sequential sample data $f_{i-2}$, $f_{i-1}$, $f_i$, and $f_{i+1}$;

said multipliers on said sample data lines for receiving said sample data of $f_{i-2}$ and $f_{i+1}$ are connected to said coefficient generating circuit to receive an interpolation coefficient of $(p^2-p)/4$ output therefrom;

said multiplier on said sample data line for receiving said sample data of $f_{i-1}$ is connected to said coefficient generating circuit to receive an interpolation coefficient of $p-(p^2-p)/4$ output therefrom; and said multiplier on said sample data line for receiving said sample data of $f_i$ is connected to said coefficient generating circuit to receive an interpolation coefficient of $1-p-(p^2-p)/4$ output therefrom.

6. The data processing module of claim 5 further comprising:

a memory for storing a plurality of sampled data including said four sampled sequential sample data $f_{i-2}$, $f_{i-1}$, $f_i$, and $f_{i+1}$.

7. A data processing module for generating an interpolated output from four sampled input data comprising:

an input means including four sample data lines for receiving each of said four sampled input data wherein each of said sample data line is connected to a multiplier;

a pseudo four-point interpolation (PFPI) coefficient generating circuit for receiving an interpolation ration p;

said PFPI interpolation coefficient generating circuit including a multiplier for multiplying said ratio p to itself to generate a $p^2$ output, an inverter and adder to generate a $p^2-p$ output, and a divider to generate a $(p^2-p)/4$ output as one of said interpolation coefficients;

said PFPI coefficient generating circuit further including adders and a multiplier for generating a $p-(p^2-p)/4$ output and a $1-p-(p^2-p)/4$ output as said interpolation coefficients;

each of said multipliers on each of said sample data lines is connected to said coefficient generating circuit to receive a interpolation coefficient therefrom for performing a multiplication of said sampled input to said interpolation coefficient thereon for generating a weighted sample output on each of said four sample data lines;

an adder connected to said four multipliers on said four sample data lines for adding said four weighted sample output to generate said interpolated output from said four sampled input data.

8. The data processing module of claim 7 wherein:

said circuit module for processing said interpolation ratio p for generating a $(p^2-p)/4$ output being configured as a programmable logic array (PLA) including a plurality of bit lines for receiving said p wherein each bit line connected with inverters, AND, and OR gates for generating a multiple bit for said $(p^2-p)/4$ output.

9. An image zooming processor for receiving a plurality of vertical image data and horizontal image data and for performing an image zooming operation on said vertical and horizontal image data comprising:

a vertical delay memory module for receiving and temporary storage of said vertical image data therein;

a vertical pseudo four-point interpolation module including four vertical data lines for receiving four of said vertical image data wherein each of said vertical data line is connected to a multiplier;

a pseudo four-point interpolation (PFPI) coefficient generating circuit for receiving a vertical interpolation ration $P_v$;

each of said multipliers on each of said vertical data lines is connected to said coefficient generating circuit to receive a vertical interpolation coefficient therefrom for performing a multiplication of said vertical image data to said vertical interpolation coefficient thereon for generating a weighted vertical output on each of said four vertical data lines;

a vertical adder connected to said four multipliers on said four vertical data lines for adding said four weighted vertical output to generate a interpolated vertical output from said four vertical input data;

a horizontal delay memory module for receiving and temporary storing said interpolated vertical output data from said vertical PFPI module;

a horizontal pseudo four-point interpolation module including four horizontal data lines for receiving four of image data stored in said horizontal delay memory module as horizontal image data wherein each of said horizontal data line is connected to a multiplier;

a pseudo four-point interpolation (PFPI) coefficient generating circuit for receiving a horizontal interpolation ration $p_v$;

each of said multipliers on each of said horizontal data lines is connected to said coefficient generating circuit to receive a horizontal interpolation coefficient therefrom for performing a multiplication of said horizontal image data to said horizontal interpolation coefficient thereon for generating a weighted horizontal output on each of said four horizontal data lines;

a horizontal adder connected to said four multipliers on said four horizontal data lines for adding said four weighted horizontal output to generate a interpolated horizontal output from said four horizontal image data; and a horizontal adder connected to said four multipliers on said four horizontal data lines for adding said four weighted horizontal output to generate a interpolated horizontal output from said four horizontal input data.

10. A method for generating an interpolated output from four sampled input data comprising the steps of:

(a) employing an input means including four sample data lines for receiving each of said four sampled input data;

(b) connecting each of said sample data line to a multiplier;

(c) employing a pseudo four-point interpolation (PFPI) coefficient generating circuit for receiving an interpolation ration p;

(d) connecting each of said multipliers on each of said sample data lines to said coefficient generating circuit to receive a interpolation coefficient therefrom for performing a multiplication of said sampled input to said interpolation coefficient thereon for generating a weighted sample output on each of said four sample data lines; and (e) connecting an adder to said four multipliers on said four sample data lines for adding said four weighted sample output to generate said interpolated output from said four sampled input data.

11. The method for generating said interpolated output of claim 10 wherein said step (d)) of receiving an interpolation coefficient from said coefficient generating circuit further comprises a step of:

(d1) utilizing said coefficient generating circuit for generating a $(p^2-p)/4$ output as one of said interpolation coefficients; and (d2) utilizing said coefficient generating circuit for generating a $p-(p^2-p)/4$ output and a $1-p-(p^2-p)/4$ output as said interpolation coefficients.

12. A method for performing an image zooming operation on a plurality of vertical and horizontal image input data comprising the steps of:

(a) receiving and temporarily storing said vertical image input data in a vertical delay memory module;

(b) employing a vertical pseudo four-point interpolation module including four vertical data lines for receiving four of said vertical image data (c) connecting each of said vertical data line to a multiplier;

(d) employing a pseudo four-point interpolation (PFPI) coefficient generating circuit for receiving a vertical interpolation ration $P_v$;

(e) connecting each of said multipliers on each of said vertical data lines to said coefficient generating circuit to receive a vertical interpolation coefficient therefrom for performing a multiplication of said vertical image data to said vertical interpolation coefficient thereon for generating a weighted vertical output on each of said four vertical data lines;

(f) employing a vertical adder connected to said four multipliers on said four vertical data lines for adding said four weighted vertical output to generate a interpolated vertical output from said four vertical input data;

(g) receiving and temporarily storing said interpolated vertical output data from said vertical PFPI module; and (h) employing a horizontal pseudo four-point interpolation module including four horizontal data lines for receiving four of image data stored in said horizontal delay memory module as horizontal image data wherein each of said horizontal data line is connected to a multiplier;

(i) employing a pseudo four-point interpolation (PFPI) coefficient generating circuit for receiving a horizontal interpolation ration $p_h$;

(j) connecting each of said multipliers on each of said horizontal data lines to said coefficient generating circuit to receive a horizontal interpolation coefficient therefrom for performing a multiplication of said horizontal image data to said horizontal interpolation coefficient thereon for generating a weighted horizontal output on each of said four horizontal data lines;

(k) connecting a horizontal adder connected to said four multipliers on said four horizontal data lines for adding said four weighted horizontal output to generate a interpolated horizontal output from said four horizontal image data; and (l) connecting a horizontal adder to said four multipliers on said four horizontal data lines for adding said four weighted horizontal output to generate a interpolated horizontal output from said four horizontal input data.

* * * * *